(12) United States Patent
McBride

(10) Patent No.: US 9,850,877 B2
(45) Date of Patent: Dec. 26, 2017

(54) SPENT FLOW DISCHARGE APPARATUS FOR AN INSTREAM FLUID POWER-EXTRACTION MACHINE

(71) Applicant: George F McBride, Machiasport, ME (US)

(72) Inventor: George F McBride, Machiasport, ME (US)

( * ) Notice: Subject to any disclaimer, the term of this patent is extended or adjusted under 35 U.S.C. 154(b) by 598 days.

(21) Appl. No.: 14/494,296

(22) Filed: Sep. 23, 2014

(65) Prior Publication Data

US 2015/0086327 A1 Mar. 26, 2015

Related U.S. Application Data

(60) Provisional application No. 61/960,677, filed on Sep. 23, 2013.

(51) Int. Cl.
| | | |
|---|---|---|
| *F03B 13/26* | (2006.01) | |
| *F03B 17/06* | (2006.01) | |
| *F03D 1/04* | (2006.01) | |

(52) U.S. Cl.
CPC .......... *F03B 13/264* (2013.01); *F03B 17/061* (2013.01); *F03D 1/04* (2013.01);
(Continued)

(58) Field of Classification Search
CPC .... F03B 13/264; F03B 17/061; F03B 17/062; F03B 1/04; F03D 1/04; F03D 80/88;
(Continued)

(56) References Cited

U.S. PATENT DOCUMENTS

| 3,047,267 A | 7/1962 | Peyrin |
| 3,986,787 A | 10/1976 | Mouton, Jr. et al. |

(Continued)

FOREIGN PATENT DOCUMENTS

EP 2395235 A2 * 12/2011 ............... F03D 1/02

OTHER PUBLICATIONS

P. Gouhier et al., "SeaUrchin: The Future is Tidal"; published at http://www.materialstoday.com/composite-applications/features/seaurchin-the-future-is-tidal; Feb. 19, 2013; accessed Nov. 2, 2016; 3 pages.

(Continued)

*Primary Examiner* — Logan Kraft
*Assistant Examiner* — Danielle M Christensen
(74) *Attorney, Agent, or Firm* — W. F. Fasse

(57) ABSTRACT

A fluid power-extraction machine is immersed in an ambient flow of a fluid, captures (and extracts energy from) a portion of the fluid, and discharges it back into the ambient flow. The machine includes a housing bounding a fluid intake inlet and including an ambient flow deflector, a downstream body arranged rearwardly from the deflector and forming a discharge outlet between the deflector and the downstream body, and a power extraction device in a fluid flow channel communicating from the fluid intake inlet to the discharge outlet. The deflector outwardly deflects and accelerates a portion of the ambient flow adjacent to the discharge outlet. A mixing surface of the downstream body extends outwardly and rearwardly from the discharge outlet, mixing the accelerated flow, the discharged flow and the ambient flow together along the mixing surface. A backflow preventer of the downstream body prevents wake backflow from impeding discharge of spent flow at the discharge outlet.

21 Claims, 10 Drawing Sheets

(52) U.S. Cl.
CPC ..... *F05B 2210/16* (2013.01); *F05B 2240/133* (2013.01); *Y02E 10/28* (2013.01); *Y02E 10/72* (2013.01)

(58) Field of Classification Search
CPC ..... F03D 9/34; F03D 9/35; F03D 9/37; F03D 9/39; F03D 9/41; F03D 9/43; F03D 9/45; F03D 9/46; F05B 2240/133; F05B 2210/16; Y02E 10/28; Y02E 10/72
USPC .............. 290/43, 54; 415/108, 905–908
See application file for complete search history.

(56) References Cited

U.S. PATENT DOCUMENTS

| | | | |
|---|---|---|---|
| 4,025,220 A | 5/1977 | Thompson et al. | |
| 4,258,271 A | 3/1981 | Chappell et al. | |
| 4,274,009 A * | 6/1981 | Parker, Sr. ............ | F03B 17/061 290/43 |
| 4,302,151 A | 11/1981 | Piguet et al. | |
| 4,720,640 A | 1/1988 | Anderson et al. | |
| 6,472,768 B1 | 10/2002 | Salls | |
| 6,971,843 B2 | 12/2005 | Desy et al. | |
| 7,032,383 B2 | 4/2006 | Weber | |
| 7,147,428 B2 | 12/2006 | Lamont | |
| 7,272,930 B2 | 9/2007 | Wiebe et al. | |
| 7,471,009 B2 | 12/2008 | Davis et al. | |
| 7,794,196 B2 | 9/2010 | Demontmorency | |
| 7,805,925 B2 | 10/2010 | Durocher et al. | |
| 7,832,979 B2 | 11/2010 | Yaras et al. | |
| 7,976,270 B2 | 7/2011 | Presz, Jr. et al. | |
| 7,980,811 B2 | 7/2011 | Presz, Jr. et al. | |
| 8,152,464 B2 | 4/2012 | Anderson, Jr. | |
| 8,376,686 B2 | 2/2013 | Presz, Jr. et al. | |
| 8,453,428 B1 | 6/2013 | Kinde, Sr. | |
| 8,579,573 B2 | 11/2013 | Kolacny | |
| 8,587,144 B2 | 11/2013 | Urch | |
| 8,622,688 B2 | 1/2014 | Presz, Jr. et al. | |
| 8,651,796 B2 | 2/2014 | Allaei | |
| 8,677,758 B2 | 3/2014 | Core | |
| 8,757,969 B2 | 6/2014 | Pruthi et al. | |
| 8,770,921 B2 | 7/2014 | Huber et al. | |
| 8,776,946 B2 | 7/2014 | Todorovic | |
| 8,786,123 B2 | 7/2014 | Bannister | |
| 8,794,902 B1 | 8/2014 | Van Ness, II et al. | |
| 8,801,359 B2 | 8/2014 | Sherrer | |
| 8,807,464 B2 | 8/2014 | Raposeiro et al. | |
| 2009/0214338 A1* | 8/2009 | Werle ................ | F03D 1/04 415/220 |
| 2010/0320771 A1 | 12/2010 | Urch | |

OTHER PUBLICATIONS

G. Thomas et al.; "Tech Briefs: The SeaUrchin Tidal Power System"; published at http://www.azocleantech.com/article.aspx?ArticleID=272; Aug. 24, 2012; accessed Nov. 2, 2016; 6 pages.
Brian Kirke, "Developments in ducted water current turbines", Sustainable Energy Centre, University of South Australia, originally dated 2003 and updated 2005, Mawson Lakes, Australia, 12 pages, www.cyberiad.net.
Ascher H. Shapiro, "Pressure Fields and Fluid Acceleration" film by A. H. Shapiro, MIT, National Committee for Fluid Mechanics Films, 1962, time frames 21:40 to 22:07, https://www.youtube.com/watch?v=L19Mi1KhFTs&list=PLOEC6527BE871ABA3&index=6&feature=plpp_video.
Jack Blake, Martha's Vineyard Shellfish Group, Inc., "Tasks Accomplished: 4) Purchase Materials and Construct Nurseries", 6 pages, http://mvshellfishgroup.org/topic.php?id=12&article=40 + http://mvshellfishgroup.org/photo.php?photo=Picture15jpg &text=View.
David Halliday et al., "Physics, Parts I and II", John Wiley and Sons, Inc., New York, 1966, ISBN 0471345255, Library of Congress 66-11527, pp. 442-443, 453-456.
Jean Delery, (Onera, France) "Separation in Three-Dimensional Flow: Critical Points, Separation Lines and Vortices", 2011, http://www.onera.fr/en/separation-in-threedimensional-flow-critical-points-separation-lines-and-vortices.
Charles N. Eastlake, "An Aerodynamicist's View of Lift, Bernoulli, and Newton", The Physics Teacher, vol. 40, Mar. 2002, pp. 166 to 173, http://oceanografia.cicese.mx/oscar/cursos/Eastlake2002.pdf.
Henri Werle, (Onera, France), "Starting Vortex Behind a Disk Normal to the Flow", http://www.efluids.com/efluids/gallery/gallery_pages/HW015/text.jsp.
Henri Werle, (Onera, France), "Horseshoe Vortex", http://www.efluids.com/efluids/gallery/gallery_pages/HW002/text.jsp.
Henri Werle, (Onera, France), "Flow Past a Hemisphere, Part of it Turbulent", http://books.google.com/books?id=VmMWjEiraXkC&pg=PA442&lpg=PA442&dq=henri+werle+photographs&source=bl&ots=CzTu-Py6RW&sig=mimmhTNX9rYOBluAgfwKSpAaeCk&hl=en&sa=X&ei=SV7sUaSeCfe34APZhoDYBQ&ved=0CDQQ6AEwAg#v=onepage&q=henri%20werle%20photographs&f=false.

* cited by examiner

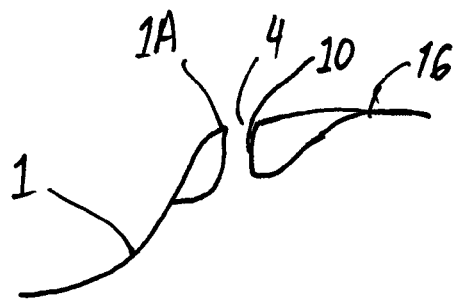
FIG. 7
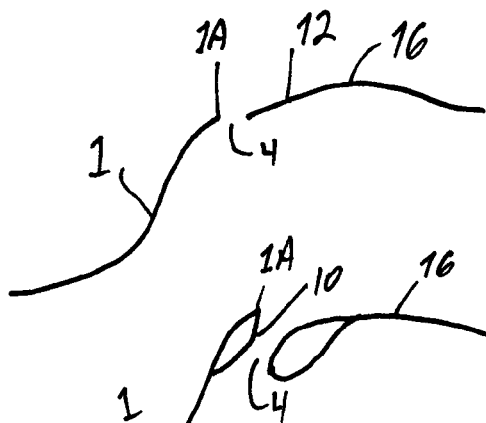
FIG. 8
FIG. 9
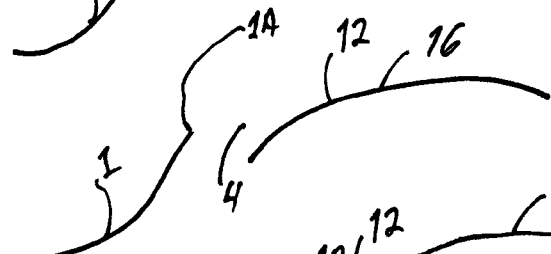
FIG. 10
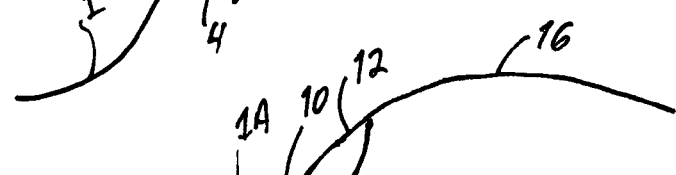
FIG. 11
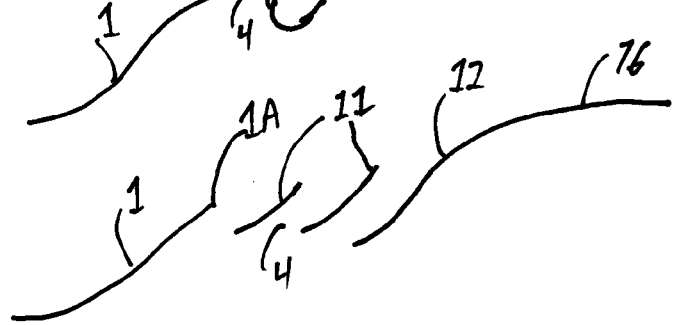
FIG. 12

SPENT FLOW DISCHARGE APPARATUS FOR AN INSTREAM FLUID POWER-EXTRACTION MACHINE

CROSS-REFERENCE TO RELATED APPLICATION AND PRIORITY CLAIM

This application claims the benefit under 35 USC 119(e) of U.S. Provisional Application 61/960,677 filed on Sep. 23, 2013, the entire disclosure of which is incorporated herein by reference.

FIELD OF THE INVENTION

The invention relates to machines submerged in a flowing fluid stream to capture a portion of the fluid and extract energy from it as it flows through the machine, and more particularly the invention relates to arrangements, structures and devices provided at a discharge outlet of such instream fluid power-extraction machines.

BACKGROUND INFORMATION

In the context of this specification, an "instream fluid power-extraction machine", or simply "fluid power machine" or "fluid machine", is any machine that is immersed or submerged in a stream of a flowing fluid, such as water or air for example, and that takes in or captures a portion of the flowing fluid from the stream, and that harnesses or extracts kinetic energy from the captured portion of flow to perform the primary intended function of the machine. For example, such a fluid machine may be a tidal hydropower turbine that harnesses energy from ebbing and flowing seawater to rotate a shaft thereby generating electricity for use at sea or on a nearby shore, or may be a turbine generator towed in fresh or salt water by a boat to produce electricity for use on the boat, or may be a windmill or wind turbine that harnesses wind power to produce electricity or provide mechanical shaft power for pumping water or driving other machines, or may be a tidal upweller that diverts flowing seawater upwards through a screen bed of seed clams or other shellfish seed to bring necessary nutrients to the seed stock, or may be any other machine that meets the criteria specified herein.

An instream fluid power-extraction machine, such as a hydropower generator, harnesses energy from a fluid stream that is not contained in a dam and is not constrained to necessarily flow through the fluid machine. The fluid machine can be stationary, as anchored in a stream flow, or moving through water as, for example, propelled by a boat. It can be of any size. One type of such fluid machine is an instream turbine that typically has one or more turbine rotors having vanes or blades configured for extracting energy from the stream in which it is immersed to power a rotating mechanism. It may provide electrical, hydraulic, or mechanical power for immediate use, for transmission to remote locations, or for storage.

In such turbine machines, various configurations of rotors and various orientations of the rotor axis with respect to the direction of ambient flow are known, as rotor axes may be oriented in-line with the flow of the stream, or vertically or horizontally transverse to the flow. Various configurations of flow feed into the rotors are also known, as rotors can be adapted to receive and redirect the intercepted flow axially, up or down, side to side, or radially inward or radially outward. In-line orientation of the rotor axis is exemplified in axial-flow propeller-type turbines used in water and air.

A radially inward fluid flow into a power-extracting turbine rotor, with a rotor axis transverse to the ambient fluid flow, is known in a turbine apparatus according to U.S. Pat. No. 8,506,244 and further developed by PfISH Turbines company of Machiasport, Me. An embodiment of such a turbine machine comprises two, matching, mirror-image rotors mounted on opposite ends of a rotatable shaft that is transverse to the stream, two spiral channels that surround and enclose the rotors and feed them with a spiraling inward flow of captured water, two intake funnels or a single common intake funnel that communicates with the two spiral channels and brings new flow in from the stream, and two spent flow channels that carry spent flow axially away from the ends of the rotors and discharge it back to the stream. The rotors take in flow all around their open intake peripheries, redirect it to an axial direction, and meanwhile harvest power from the flow. The entire disclosure of U.S. Pat. No. 8,506,244 is incorporated herein by reference.

All of such instream fluid power-extraction machines suffer several problems or limitations, however. A first problem is that the flowing fluid is not constrained to flow into the inlet(s) of the machine; instead the fluid can simply flow around the machine. A fundamental challenge of designing and operating an instream fluid machine is to get the fluid of the stream to flow into and through, and interact with, the machine rather than flowing around it. This contrasts markedly with conditions applying to a hydropower turbine that is fed water with an increased dynamic pressure and/or static pressure in a constrained manner from a dammed impoundment through a penstock, from which all of the water must flow through the turbine. On the other hand, in an instream fluid machine, the inlet, the entire internal flow path (including the flow conditions through the power-extracting rotor), and the discharge outlet cannot exhibit an excessive obstruction to the flow, because then to a corresponding extent the incident ambient flow will be diverted around the inlet(s).

A second problem is that extracting energy from the captured fluid (thereby producing "spent" fluid) necessarily reduces the spent fluid's total energy (and therewith its total pressure). A theoretical problem arises because if one could extract all of the kinetic energy from the flowing fluid, then the speed thereof would be reduced to zero, so that the spent fluid could not be expelled or discharged from the machine, and thus no new incident fluid could enter the machine and the energy extraction would fall to zero. Namely, the extracted power is proportional to new flow coming in. In view of this problem, the well known Betz limit specifies the maximum energy portion, about 59%, that can theoretically be extracted from the fluid flowing through such a turbine rotor.

A third problem is that the spent fluid must be discharged back into the ambient fluid stream that is flowing around the immersed machine, but the spent fluid has a lower total pressure and lower total energy, in comparison to the surrounding ambient flow because some of the captured fluid's energy has been extracted by the machine. The pressure prevailing at the discharge outlet(s) of the machine specifies the pressure at which the spent fluid must be discharged. If a diffuser, barrier or other structure is provided to reduce ambient pressure at the outlet, in an effort to "suck" more captured fluid through the machine, then such reduced pressure would just as much "suck" downstream ambient fluid backwards into the discharge outlet, thereby impeding the discharge of the spent fluid. Furthermore, the overall structure of such an instream machine acts as an obstruction of the ambient stream of fluid. Where smooth, e.g. laminar, ambient fluid flow encounters an obstruction, it forms a three-dimensional topology of disturbance around the obstruction, namely a shifting pattern of "separated flow" that varies in shape, location and intensity with the physical characteristics of the fluid (e.g. speed, density and viscosity) and the configuration, orientation and size of the obstruction in its path. Most importantly, this disturbance of the ambient flow produces vortices, turbulence, and varying lines of attachment and detachment in a "wake" downstream from the instream fluid machine, whereby the wake's turbulent zone persists for some distance downstream from the machine. Various wake and vortex patterns are commonly known. This downstream wake creates a "backwash", which has little or no downstream component of flow, or even has an upstream component of flow, at the downstream side of the machine, and which can thus also hinder the discharge of spent fluid from the machine's discharge outlets. There is thus a longstanding problem and longfelt need in the art, to re-energize the spent fluid and rapidly discharge it back into the ambient flow.

Most existing conventional instream fluid power-extraction machines, such as tidal power turbines and wind turbines, do not include provisions to facilitate the reintroduction of the spent fluid flow back into the ambient stream at the discharge outlet(s) of the machine. Many such machines simply discharge the spent flow axially downstream back into the surrounding ambient stream, with no consideration given to attempting to efficiently introduce the lower-energy lower-total-pressure spent fluid into the higher-energy higher-total-pressure ambient stream. The result is a turbulent downstream flow with vortices and the like, due to the turbulent unguided or uncontrolled mixing of the spent flow with the ambient flow and due to the turbulence introduced by the structure of the machine itself, which can hinder the discharge and thus the through-flow of fluid through the machine.

Many designs of instream turbine are known. In principle of operation, they share a common characteristic, namely that their source of motive power is the pressure gradient that develops in the free flow field of ambient flow around the operating machine. If you make the fluid do external work you reduce its total pressure. The pressure difference between a turbine intake inlet that faces into the ambient stream and a turbine discharge outlet that is downstream drives through the machine the fluid that makes the machine perform its intended function. Regarding orientation of the machine, it is generally clear that an intake inlet should face directly at the oncoming flow, as velocity of the stream drives fluid toward and into the machine. Not so easily specified, however, is the orientation of a discharge outlet. The backflow inherent in the downstream wake opposes the flow from the discharge outlet.

The purpose of an instream fluid power-extraction machine such as a hydrokinetic turbine is to extract kinetic energy from the flowing stream in which it is deployed. At the inlet opening, entering flow carries the momentum of the stream. It is easy to see how captured internal flow expends energy as it drives the load, e.g. a rotor connected to a shaft driving an electric generator, but external flow expends energy as well. Consider internal and external flows meeting at the discharge outlet opening—pressure there is common to both flows. Failure to adequately re-energize the spent internal flow interferes with returning it to the stream. That reduces the internal volume flow rate or throughput, and thus the power, in comparison to what might be achieved.

Typically the discharge outlet of an instream turbine faces directly away from the stream, i.e. directly in the downstream direction. In some designs the discharge outlet is enlarged and moved rearward with a diffuser, also called an augmentation channel. Inside the diffuser, spent flow moving toward the discharge opening slows down, controlled by the expanding channel shape of the diffuser, while outside the diffuser the exterior flow that surrounds the machine is pushed outwards, away from the machine, by the outer surface of the diffuser. The diffuser allows the discharge outlet to be sized bigger than it otherwise would be. Also, these diffusers suffer an ever-diminishing effectiveness of the mixing and re-energization of spent flow as the machine becomes larger. Namely, the captured volume of fluid increases proportionally with the area of the intake inlet which increases proportionally with the radius squared, but the induction area of the diffuser increases proportionally with the circumference thereof which increases proportionally with the radius. Thus, the diffuser becomes less effective as the radius of the machine increases.

Slots are sometimes opened in the diffuser wall to let some of the exterior flow enter in and mix with the spent flow inside, attempting thereby to energize that spent flow and reduce the detractive effect of the so-called boundary layer near the inner surface of the diffuser, where friction slows the flow. Other designs take a different approach, having a second shroud outside of the first, whereby the second shroud captures some of the surrounding flow outside of the machine and redirects it inward and rearward to mix with the spent flow at the discharge outlet, to energize it, entrain it, and eventually carry it away. These approaches to discharge outlet design offer some benefit in turbine performance, but the backflow of the wake still works against the spent flow discharge, because the discharge outlet is still located in the downstream "flow shadow", and thus in the turbulent wake and backflow, of the structure of the machine. Also, all of these known designs draw exterior ambient flow into the lower-pressure spent flow inside the discharge channel rather than directing interior spent flow out into the ambient stream. That has the effect of constraining the location of the mixing zone (where spent flow can be energized) to the "flow shadow" region of the ambient stream, downstream of the machine itself, thereby limiting the mixing zone as to its size and effect.

Instream hydrokinetic turbine machines having the above-discussed features such as a shroud around the turbine and an ejector structure around the shroud in order to draw exterior ambient water into the central axial discharge channel, are disclosed, for example in U.S. Pat. No. 3,986,787, U.S. Pat. No. 4,025,220, U.S. Pat. No. 7,832,979, U.S. Pat. No. 7,976,270, U.S. Pat. No. 7,980,811, U.S. Pat. No. 8,376,686, and U.S. Pat. No. 8,622,688. As mentioned above, all of those turbine machine designs merely attempt to induct exterior ambient water into the spent discharge flow that flows axially downstream from the downstream side of the rotor. There is no structure provided to prevent or avoid the influence of wake turbulence on the discharge and no structure provided to direct the spent flow by itself radially or laterally outwards into an accelerated ambient flow to bring about mixing and re-energization of the spent flow into an accelerated ambient flow outside of the machine structure. There is also no provision to make use of momentum of an accelerated exterior flow to bring about mixing of the spent flow with the exterior fluid outside of the machine.

In any instream fluid power-extraction machine such as a hydrokinetic turbine, the generated power is proportional to new flow coming in. Spent flow at the turbine discharge has equal volume as the new flow coming in, but less energy and speed. If the power of incoming flow were to be completely harvested, for example, then spent flow wouldn't even move as discussed above. Sluggish flow at the discharge is a fundamental problem. Discharge is additionally impeded by the backwash of the downstream wake. A basic question that remains to be answered is thus how the spent flow can be more effectively re-energized, entrained with the ambient flow, and rapidly carried away to make room for new flow entering an instream machine. Namely, how can you most efficiently and effectively energize the spent flow that comes from the machine, and reintroduce it back into the stream? The need for solving this problem is common to all fluid power-extraction machines. Momentum of the stream passing by provides the only energy available to use. The present invention addresses this problem with a novel approach.

SUMMARY OF THE INVENTION

In view of the above, it is a general object of the present invention to develop a scalable, efficient, cost-effective technology that converts a high proportion of captured stream flow into useful power. Another object of one or more embodiments of the invention is to configure an instream fluid power-extraction machine as well as a spent flow discharge apparatus therefor in order to purposely create an accelerated exterior fluid flow pattern and/or turbulence pattern, and to exploit such flow patterns for energizing the removal of spent flow from the apparatus. It is a further object of one or more embodiments of the invention to provide a structure that prevents "backflow" effects in a downstream wake of the machine from negatively influencing the discharge of spent fluid flow through one or more discharge outlets of the machine. Another object of one or more embodiments of the invention is to provide and configure a structural component to act as a mixing surface against which the spent flow discharged from the machine can be effectively mixed with an accelerated external fluid flow. Still another object of one or more embodiments of the invention is to provide a downstream tail configuration of the apparatus so as to reduce or minimize wake turbulence and downstream disturbance of the ambient flow field aft or downstream of the machine.

Another general object to be achieved in connection with the above objects in one or more embodiments of the invention is to be able to arrange multiple instream fluid power-extraction machines such as hydropower turbines or wind turbines more closely to one another in a "turbine farm" arrangement, while avoiding or minimizing the influence of wake turbulence of one such machine on adjacent downstream machines. The invention further aims to avoid or overcome the disadvantages of the prior art, and to achieve additional advantages, as apparent from the present specification. The attainment of these objects is, however, not a required limitation of the claimed invention.

The above objects can be achieved by one or more embodiments of an instream fluid power-extraction machine and/or a spent flow discharge apparatus for such a machine according to one or more features disclosed herein. According to one embodiment of the invention, an instream fluid power-extraction machine that is to be immersed in an ambient flow of a surrounding fluid so as to capture a portion of the fluid, extract energy from the captured fluid and then discharge the captured fluid as spent fluid back into the ambient flow, comprises a housing, a downstream body, a fluid flow channel and a power extraction device. The housing bounds a fluid intake inlet and includes an ambient flow deflector that extends laterally or radially outwardly to an outer edge thereof located laterally or radially outwardly from the fluid intake inlet. The ambient flow deflector is configured and arranged to intercept and deflect outwardly a portion of the ambient flow to form an accelerated flow at the outer edge of the ambient flow deflector. The downstream body is arranged axially rearwardly from the ambient flow deflector. A discharge outlet is formed between the outer edge of the ambient flow deflector and a forward portion of the downstream body. The downstream body also comprises a mixing surface that extends laterally or radially outwardly from the forward portion, preferably (but not necessarily) to a widest part of the downstream body located axially rearwardly from the discharge outlet. The downstream body further comprises a backflow preventer that includes a closed imperforate backflow prevention surface that extends from the widest part of the downstream body laterally or radially inwardly to an axial center line, e.g. so that the entire backflow prevention surface of the backflow preventer is closed and impervious to fluid flow through it. The fluid flow channel within the machine communicates from the fluid intake inlet to the discharge outlet, and the power extraction device such as a turbine rotor, is arranged in the fluid flow channel and is configured to extract power from the captured fluid flowing in the fluid flow channel from the fluid intake inlet to the discharge outlet.

In a presently preferred embodiment, the widest part of the downstream body is located laterally or radially outwardly farther than the outer edge of the ambient flow deflector and farther than the discharge outlet. The mixing surface of the downstream body thus extends rearwardly and outwardly from the discharge outlet.

In a further preferred embodiment, the discharge outlet is located and configured to discharge the captured fluid as discharged fluid into the accelerated flow of the surrounding fluid coming from the ambient flow deflector, and the mixing surface is located and configured to mix the discharged fluid into the accelerated flow of the surrounding fluid by a boundary layer shearing effect along the mixing surface and/or a laminar flow shearing effect of the ambient flow meeting the discharged fluid and the accelerated fluid. For example, the discharged fluid is discharged or ejected from the discharge outlet at a narrow acute angle (or parallel) relative to the accelerated flow flowing off of the outer edge of the ambient flow deflector, whereby the accelerated flow begins to entrain and mix with the discharged flow. Then further, the ambient flow of fluid flowing laminarly axially rearward impinges onto the accelerated flow and discharged flow and serves to press the mixing flows against the mixing surface while imparting additional energy to the mixing action. This combination of the three flows, in effect, provides a smearing, shearing and/or wiping effect of the three flows onto and along the mixing surface, which enhances the mixing and uniformalization of these three flows. For this purpose, the mixing surface preferably extends at an outward angle that is a relatively narrow acute angle relative to the laminar axial ambient flow or relative to the accelerated flow deflected outwardly from the outer edge of the ambient flow deflector, or an angle therebetween.

In a further embodiment, the accelerated flow separates from the housing at the outer edge of the ambient flow deflector upstream of the discharge opening, and there mixes turbulently with the discharged fluid flow as these two fluids travel together outward and rearward along the mixing surface, preferably all the way from the discharge opening to the widest part of the downstream body, thereby energizing and entraining the discharged fluid and carrying it away. The mixing surface and therewith the downstream body thus preferably extend outwardly into the ambient flow far enough for shearing effects to take place for the intended mixing.

According to a further preferred embodiment feature, the concavely curved ambient flow deflector and its outer edge, the forward portion and the mixing surface of the downstream body, and the discharge outlet are configured and arranged so that the accelerated flow of the exterior fluid is deflected (radially or laterally) outwardly by the ambient flow deflector and from its outer edge, but then curves toward the downstream axial ambient flow direction by its interaction with the laminar ambient flow. This creates a location of a convex curvature of the accelerated flow outwardly and rearwardly from the outer edge of the ambient flow deflector. The discharge outlet is preferably located inside this region (e.g. inwardly from the inner concave side of the outwardly convex curvature of the accelerated flow), because this location provides a reduced static pressure that serves to draw the spent fluid flow out through the discharge outlet as the abovementioned discharged fluid. Also, the outward momentum of the accelerated flow of fluid, the narrowness of the discharge opening, and the presence of a mixing surface preferably combine to prevent the accelerated flow of exterior fluid from curling inwardly into the area of the discharge outlet, but rather to entrain the discharged fluid flow along with the accelerated flow to begin mixing these two flows together as they then flow along the mixing surface, with further interaction by the laminar ambient flow pressing against the mixing surface.

BRIEF DESCRIPTION OF THE DRAWINGS

In order that the invention may be clearly understood, it will now be described in connection with example embodiments thereof, with reference to the accompanying drawings, wherein:

FIGS. 7 to 12 are schematic sectional diagrams of different configurations of a discharge outlet formed between an outer edge of an ambient flow deflector and a forward portion of the downstream body;

DETAILED DESCRIPTION OF A PREFERRED EXAMPLE EMBODIMENT AND OF THE BEST MODE OF THE INVENTION

Figure 1:
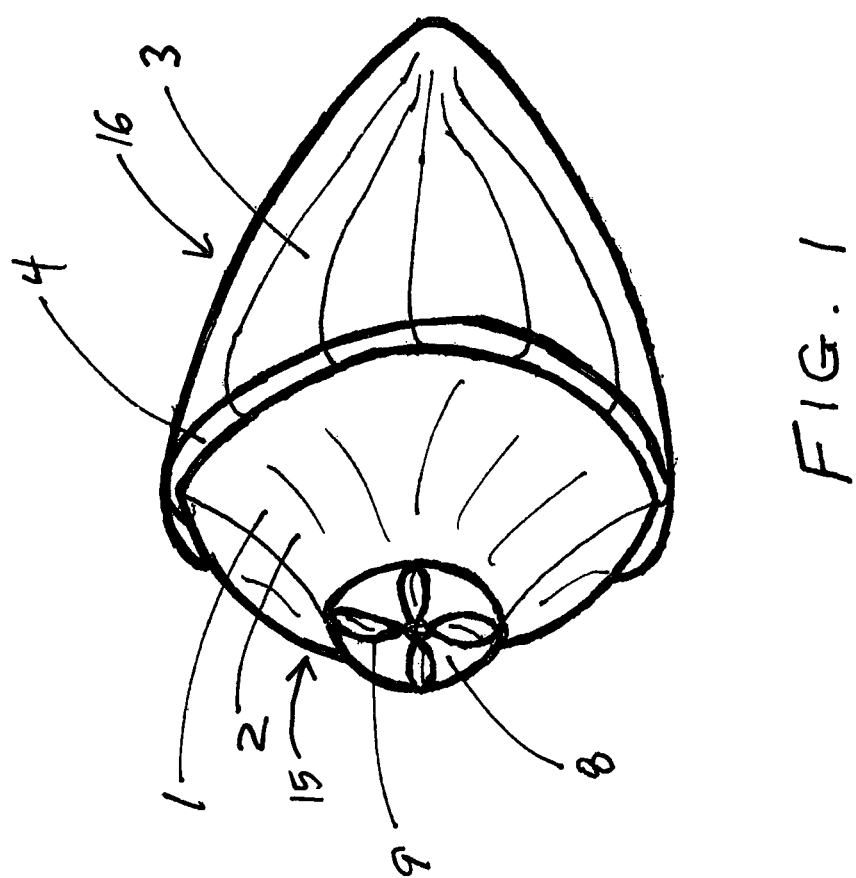
FIG. 1 is a schematic perspective illustration of a representative example embodiment of an instream fluid power-extraction machine with a spent flow discharge apparatus according to an embodiment of the invention.
Figure 2:
FIG. 2 is a schematic axial sectional diagram of the apparatus according to FIG. 1, including schematic streamlines to indicate fluid flow patterns inside and outside of the machine.

FIGS. 1 and 2 schematically illustrate a representative example embodiment of an instream fluid power-extraction machine with a spent flow discharge apparatus according to the invention. Overall, this combination may be called simply the machine or simply the apparatus. The machine includes a forward housing 15 as well as an aft or downstream body 16. The forward housing 15 bounds a fluid intake inlet 8 that leads into a fluid flow channel 2. The forward housing 15 further includes an ambient flow deflector 1 that extends radially or laterally outwardly and rearwardly from the opening of the fluid intake inlet 8, and terminates radially or laterally outwardly at an outer edge 1A. In this embodiment, the inner surface of the ambient flow deflector 1 can be regarded as a channel wall forming the interior fluid flow channel 2. A power-extraction device such as a rotor 9 is arranged within the fluid flow channel 2, for example at or near the fluid intake inlet 8. The rotor 9 may be any configuration or orientation of a rotor, and is represented simply schematically here as an axial flow rotor with its axis aligned with an axial direction defined by the direction of laminar ambient flow 5 of the fluid in which the machine is immersed. Alternatively, the rotor may have its axis aligned transversely to the ambient flow direction, but in such a case the "axial direction" will still refer to the direction of ambient flow 5 and the overall alignment of the machine with respect to that direction.

The aft or downstream body 16 includes a forward portion which is here represented by a flange 10 with a streamlined flow contour configuration. A discharge outlet 4 is formed or bounded between the outer edge 1A of the ambient flow deflector 1 and the flange 10 of the downstream body 16. The downstream body 16 further includes a mixing surface 12 progressing rearwardly and outwardly from the flange 10 until reaching the widest part 14 or maximum beam of the downstream body 16. The streamline-contoured flange 10 transitions fairly and smoothly into the mixing surface 12. In other embodiments, the mixing surface can be considered to extend rearwardly beyond the widest part, or to terminate before reaching the widest part, depending on the mixing that is achieved due to the configuration of the several components. From the widest part 14, extending radially or laterally inwardly, and in this embodiment rearwardly, the downstream body 16 further includes a backflow preventer 3 with an imperforate closed backflow prevention surface that is impermeable to the fluid, and thus prevents penetration or any influence through the backflow preventer 3 by a downstream wake 7 in the fluid downstream from the machine. The downstream body 16 is particularly configured so that the downstream wake 7 is displaced rearwardly from the discharge outlet 4 and preferably rearwardly from the mixing surface 12, and further preferably rearwardly from the widest part 14 of the downstream body. Thus, the downstream wake 7 has no influence on the discharge of the fluid from the discharge outlet 4.

In the machine, as the incoming fluid entering the fluid intake inlet 8 flows through the rotor 9, the rotor is caused to rotate, extract energy from the fluid, and perform work, e.g. rotating an electrical generator. Thereby, kinetic energy is removed from the fluid which thus flows more slowly and is termed spent flow 6 on the downstream side of the rotor 9 within the fluid flow channel 2. The spent flow 6 is directed to and flows out of the discharge outlet 4. In the present embodiment, the interior volume of the backflow preventer 3 is hollow and forms a fluid plenum space that is filled with spent flow 6, which is free to circulate and flow without constraint except upon reaching the curved flange 10 and the outer portion of the inner channel wall of the ambient flow deflector 1 leading to the outer edge 1A. Here, the two boundaries form a channel leading to the discharge outlet 4. This channel may be shaped to accelerate, decelerate or maintain the same flow speed of the spent fluid 6 throughout the discharge channel and as it is ejected from the discharge outlet 4. In other embodiments, the backflow preventer interior may be solid or sealed from the spent flow 6, so that it is not filled with the spent flow. Instead, a conically split or branched fluid flow channel leads axially rearwardly from the rotor 9 to a divergence location, and from there the fluid flow channel is divided and diverges smoothly along curving channel portion(s) out to the discharge outlet(s) 4.

The ambient flow deflector 1 is configured and arranged to intercept and deflect outwardly a portion of the ambient flow 5 thereby forming accelerated flow 5A as the fluid streams outwardly and rearwardly from the outer edge 1A of the ambient flow deflector 1. Here, the accelerated flow 5A further interacts with the ambient flow 5 that streams axially downstream. This causes the accelerated flow 5A to also curve toward the downstream axial direction, thereby forming a convex curvature of the flow directly outside adjacent to the discharge outlet 4, with a concave inner side of the curved flow facing inwardly toward the discharge outlet (see example streamlines schematically shown in FIG. 17). This creates an area of reduced static pressure along with the increased dynamic or velocity pressure of the accelerated flow 5A. This area of reduced static pressure drives, i.e. "sucks" the spent flow 6 outwardly through the discharge outlet 4. While the reduced static pressure in the area of the discharge outlet 4 also has an influence to draw in the accelerated flow 5A, the outward momentum of the accelerated flow 5A deflected by the ambient flow deflector 1 continues to carry the accelerated flow 5A outwardly and then rearwardly away from the discharge outlet 4, so that the accelerated flow 5A does not tend to vortex or curl into the discharge outlet 4.

Outside of the machine, the ambient flow 5 everywhere has a constant total pressure made up of the static pressure component and the dynamic or velocity pressure component. Where the ambient flow 5 is deflected by the ambient flow barrier 1, the fluid accelerates to form the accelerated flow 5A, for example having a speed of about 1.5 to 3 times the ambient flow speed. Thus, in the accelerated flow 5A, while the total pressure is the same as that of the ambient flow 5, the static pressure is reduced but the dynamic or velocity pressure is increased relative to the ambient flow 5. At the fluid intake inlet 8 the total pressure is the same as that of the ambient flow 5. When the fluid passes through the rotor 9, which extracts energy from the fluid, thereby the total pressure of the spent flow 6 within the machine is reduced relative to the total pressure of the ambient flow 5 outside of the machine. The proportionate balance between the dynamic or velocity pressure and the static pressure of the spent flow 6 within the machine can be varied essentially as desired according to Bernoulli's relationship, by changing the configuration and dimensions of the various components of the fluid flow channel, which becomes especially pertinent in the discharge channel leading to the discharge outlet 4. At the discharge outlet 4, it is necessary to merge and mix the lower-pressure lower-energy spent fluid 6 into the fluid outside of the machine. The static pressure outside of the outlet 4 must be lower than the static pressure inside the fluid flow channel 2 leading to the outlet 4 in order for the spent fluid 6 to flow outwardly. However, the total pressure outside the outlet 4 is higher than the total pressure of the spent fluid 6 inside the fluid flow channel because energy has been removed from the fluid by the rotor 9. Thus, the dynamic or velocity pressure outside of the outlet 4 must be higher than inside the fluid flow channel 2 leading to the outlet, because total pressure equals dynamic or velocity pressure plus static pressure everywhere.

The discharge of the spent fluid 6 through the outlet 4 is therefore achieved by accelerating and re-energizing the spent fluid 6 by inducting and mixing the discharged fluid into the accelerated fluid 5A outside of the outlet 4. The resultant mixed fluid flows at a now acute glancing angle along the mixing surface 12. Here, the axial downstream ambient flow 5 also drives the mixed fluids against the mixing surface 12 and provides further energy and further mixing by a boundary layer shearing effect along the mixing surface and/or a laminar flow shearing effect of the ambient flow meeting the discharged fluid and the accelerated fluid. This mixing effect can be considered by analogy to a physical mechanical mixing of two viscous components with each other, for example the mixing of a polymer resin with a hardener to form a thermosetting polymer compound. To achieve this, it is typically known to smear or wipe a quantity of hardener onto and together with a quantity of resin along a mixing plate using a putty knife or spatula at a relatively narrow acute glancing angle. The putty knife smears and mixes the hardener into and with the resin by pressing and drawing the putty knife over the mixing plate. In the context of the present invention, the ambient flow 5 presses, draws, smears and mixes the accelerated flow 5A together with the discharged spent fluid 6 coming out of the discharge outlet 4 as a mixture along the mixing surface 12. The ambient fluid 5 is similar to the putty knife as it presses the other two components (the accelerated fluid and the discharged fluid) into intimate mixture with one another along the mixing surface 12.

The mixing surface 12 can be considered to extend rearwardly to the widest part 14 of the downstream body 16, while mixing may continue somewhat beyond the widest part 14 or already end somewhat upstream from the widest part 14. At some point rearwardly or downstream from the widest part 14, increased flow separation and formation of a turbulent downstream wake 7 may occur. This downstream wake 7 is displaced sufficiently rearwardly and downstream, however, so that it does not influence the flow conditions at the discharge outlet 4 and thereby does not hinder the discharge of spent fluid 6 through the discharge outlet 4.

Further particular features and aspects of one or more embodiments of the invention are as follows, also referring to FIGS. 1 and 2, but relating to a separately considered embodiment or embodiments in comparison to the discussion above.

To provide a spent flow discharge structure for an instream hydropower generator, the structure includes an ambient flow barrier (or deflector) 1, an exterior surface of which is adapted for controlling nearby ambient flow 5 outside the machine and pushing it farther away from the machine, as the flow passes by. The structure includes a spent flow discharge channel 2, an interior surface of which encloses spent flow 6 that makes its way toward discharge. The structure includes a backflow preventer 3 that tapers to a small end or may be truncated, an exterior surface of which is adapted at its forward part for mixing spent flow into the stream, and at its aft part for shaping or controlling the coming together of ambient flow and spent flow as they are carried away downstream. The ambient flow barrier 1, spent flow discharge channel 2, and backflow preventer 3 are shaped, located and oriented in combination with each other to accomplish the objects of this embodiment of the invention.

It is further provided to shape, locate and orient the ambient flow barrier 1, spent flow discharge channel 2, and backflow preventer 3 in combination with each other so as to leave a gap that is the spent flow discharge opening 4. The spent flow discharge opening 4 provides an opening for spent flow 6 to leave the confines of the machine and join with the ambient flow 5 passing by. The spent flow discharge opening 4 may be fitted with a flange 10, to better control the direction of spent flow discharge.

It is further provided to shape, locate and orient the ambient flow barrier 1, spent flow discharge channel 2, and backflow preventer 3 in combination with each other to prevent, reduce or avoid the interference of the downstream wake 7 with the extraction of spent flow 6 out of the spent flow discharge opening 4.

It is further provided to shape, locate and orient the ambient flow barrier 1, spent flow discharge channel 2, and backflow preventer 3 in combination with each other so as to shape the ambient flow 5 as a free flow field that is influenced by the barriers in its way, giving the ambient flow 5 a configuration of speed and curvature that draws spent flow 6 away from the spent flow discharge opening 4, thereby clearing the way for additional flow to pass through the machine.

The inventive structure is shown (FIG. 1, FIG. 2) with an example embodiment that includes a turbine rotor 9 of axial design. It will be appreciated that the objects of the invention according to the specification herein can be achieved for other instream turbines and other turbine rotor designs, and that the invention is intended to cover all modifications and equivalents within the scope of this specification and any claims that from it might arise.

For an operating turbine (FIG. 2), a portion of ambient flow 5 enters into an intake inlet 8 and expends energy to perform a useful function, such as causing a turbine rotor 9 to power a load. Having lost some of its initial energy, it then becomes spent flow 6, moves toward and passes through a spent flow discharge opening 4, and merges back with the stream. The turbine is an obstruction to the stream, deflecting away such regions of ambient flow that pass nearby the turbine without entering in. As the deflected ambient flow passes by the ambient flow barrier 1, adjacent to the spent flow discharge opening, it speeds up and turns back to travel with the stream. There develops an area of static pressure that is lower than that of the stream. The static pressure there is lower for two reasons: First, ambient flow speeds up as streamlines near the ambient flow barrier 1, all representing equal volumes of flow, are compressed against that barrier by the streamlines that are farther from the machine. Where ambient flow speeds up, dynamic pressure increases, and according to Bernoulli's equation, which in simplified form states that dynamic pressure plus static pressure equals total pressure (a constant), static pressure is correspondingly decreased. Secondly, the spent flow discharge opening 4 is on the inside of the curvature of ambient flow where that flow makes its turn, and there is developed by principles of hydrodynamics a centripetal pressure gradient perpendicular to the curve of the flow, with lower pressure on the inside of the curve.

The lower static pressure of the deflected ambient flow 5 relative to spent flow 6 that is inside the machine, applies an accelerating force through the spent flow discharge opening 4 that operates to draw the spent flow and ambient flow together. The spent flow discharge opening 4 is configured to pass spent flow out of the machine in the direction of the accelerating force, while the ambient flow outside of the machine has momentum sufficient to carry it past the discharge opening without entering in. The momentum of the ambient flow is combined with that of the spent flow and together they are mixed and carried away in the downstream wake 7.

Backflow components of the downstream wake 7, where ambient flow 5 and discharged spent flow 6 mix and are eventually carried away, are prevented from interfering with the discharge of spent flow by the presence of the backflow preventer 3, which, at its forward part near the spent flow discharge opening 4, is configured to be larger than the ambient flow barrier 1, extending further out into the stream. Thus the external surface of the backflow preventer at its forward part provides a mixing surface 12 that presents an obstruction that obtrudes into the region of ambient flow and the ambient flow continues to be pushed away as it passes by, the result of which is a continuing opportunity for mixing of ambient flow together with spent flow discharged. Furthermore, the discharge of spent flow 6 occurs in a region of streaming flow, and thus is not opposed by backflow components of the downstream wake 7.

In the example embodiment shown (FIG. 1, FIG. 2), the ambient flow barrier 1 and a portion of the discharge channel 2 are combined into a single structure, a wall, with the outer surface of the wall providing the function of the ambient flow barrier and the inner surface of the wall providing the function of the discharge channel. However, that is not a required feature of the inventive structure. The ambient flow barrier and discharge channel can be separate structures with unrelated surface contours, respectively. In the example embodiment shown, the backflow preventer 3 and a portion of the discharge channel 2 are combined into a single structure, a wall, with the outer surface of the wall providing the function of the backflow preventer and the inner surface of the wall providing the function of the discharge channel. However, that is not a required feature of the inventive structure. The backflow preventer and the discharge channel can be separate structures with unrelated surface contours, respectively.

Figure 3:
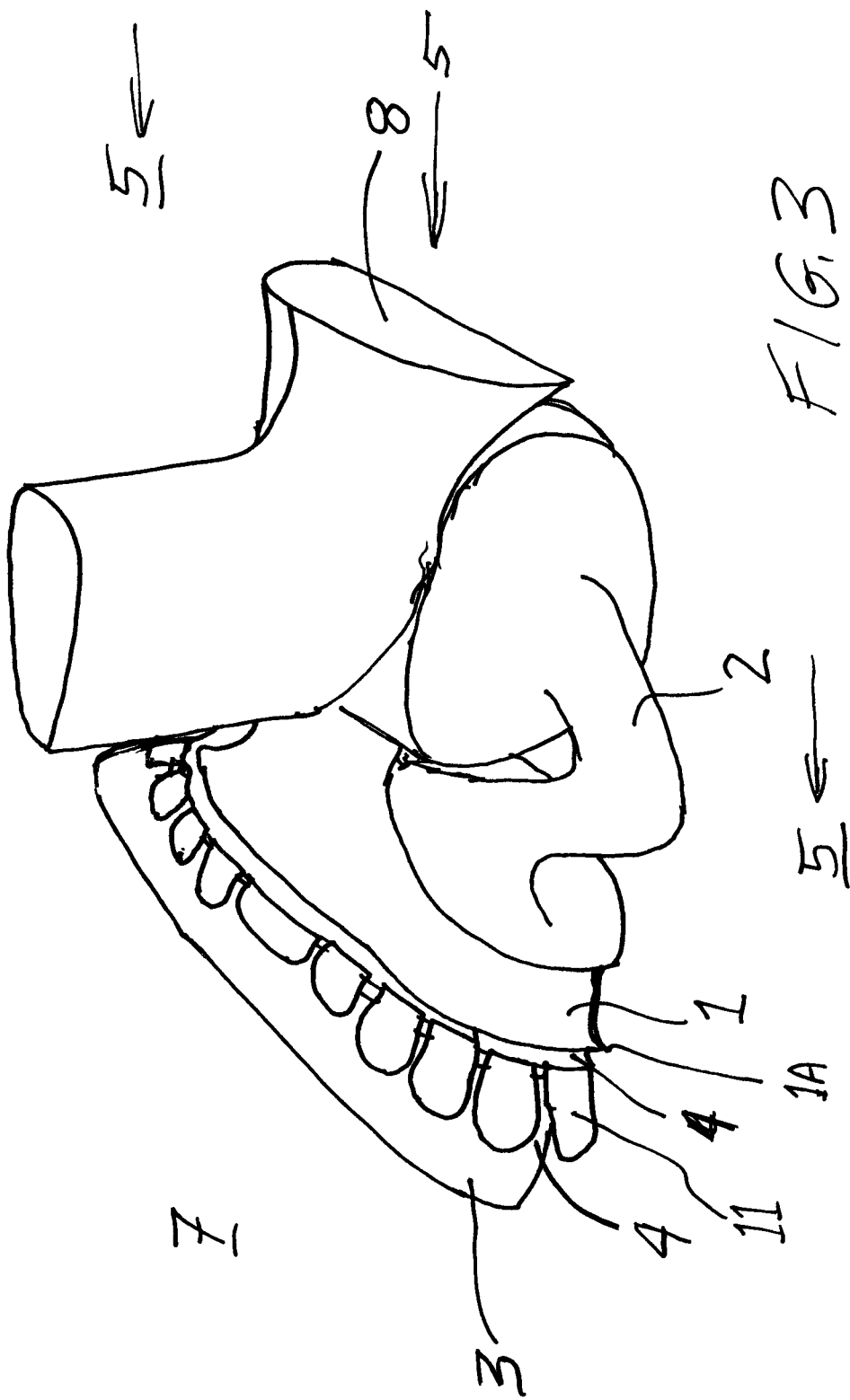
FIG. 3 is a schematic perspective sketch of a hydrokinetic turbine device with a spent flow discharge apparatus according to another embodiment of the invention as tested.

FIG. 3 is a schematic sketch of a machine that has been built for testing, including a turbine apparatus generally according to the disclosure of U.S. Pat. No. 8,506,244 and further developed according to an embodiment of the present invention. The turbine apparatus includes a fluid intake inlet 8 that leads to a spiral volute feeding water to two rotors (not visible in FIG. 3), arranged on a common axis extending transversely to the ambient flow 5. The lateral outer ends of the two rotors discharge water into fluid flow channels 2 curving rearwardly to a discharge outlet 4. An ambient flow deflector 1 deflects the ambient flow 5 outwardly before the discharge outlet 4. A backflow preventer 3 is mounted aft or downstream of the discharge outlet 4. Additionally, a ring of discharge vanes 11 is mounted within and extending outwardly and rearwardly from the discharge outlet 4. Thus, the discharge outlet 4 is divided by the ring of discharge vanes 11, so that some spent fluid is discharged between the ambient flow deflector 1 and the discharge vanes 11, and some spent fluid is discharged between the discharge vanes 11 and the backflow preventer 3. The discharge vanes 11 serve as additional mixing elements and as additional deflector surfaces. The forward surface of each vane 11 provides an additional mixing surface on which discharged fluid and accelerated fluid can be mixed, and also acts as an additional ambient flow deflector to further deflect the flow and guide it outwardly for then interacting with additional discharged fluid that exits between the discharge vanes 11 and the backflow preventer 3. The portion of the backflow preventer 3 that extends outwardly and rearwardly from the discharge vanes 4 out to a widest part of the backflow preventer 3 acts as a mixing surface on which additional mixing occurs. Testing has shown that the discharge vanes 11 provide a significant increase and power output of the turbine machine, especially at velocities of the ambient flow 5 above 4 knots or especially above 5 knots. As a further feature in addition to or instead of the discharge vanes 11, the outer edge 1A of the ambient flow deflector 1 may be convoluted, scalloped, pleated or fluted, for example in the manner of a conventionally known ejector or eductor shroud, in order to increase the perimeter length (and area) of the mixing interface between the accelerated exterior fluid and the discharged spent fluid. These alternative configurations of the outer edge 1A are not illustrated, however. The backflow preventer 3 prevents the downstream wake 7 in the flow "shadow" of the machine from influencing the fluid flow conditions at the discharge outlet 4.

Figure 4:
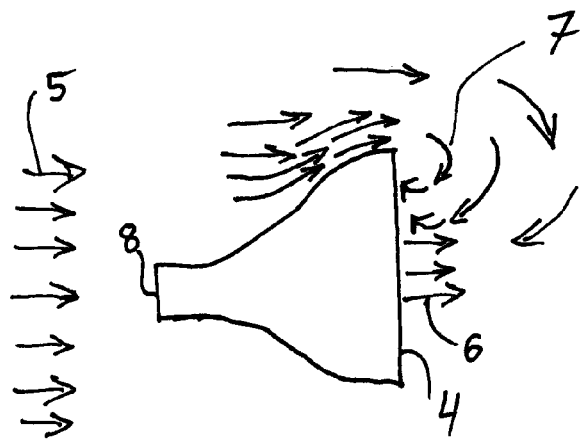
FIG. 4 is a schematic side view illustration of an axial downstream discharge of spent flow from a turbine machine without a spent flow discharge apparatus.
Figure 5:
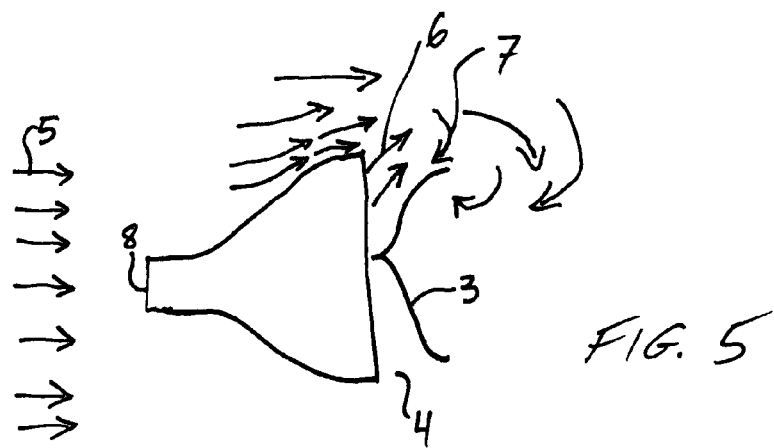
FIG. 5 is a schematic side view similar to FIG. 4, but showing an additional spent flow discharge apparatus including a backflow preventer of smaller width than the turbine machine.
Figure 6:
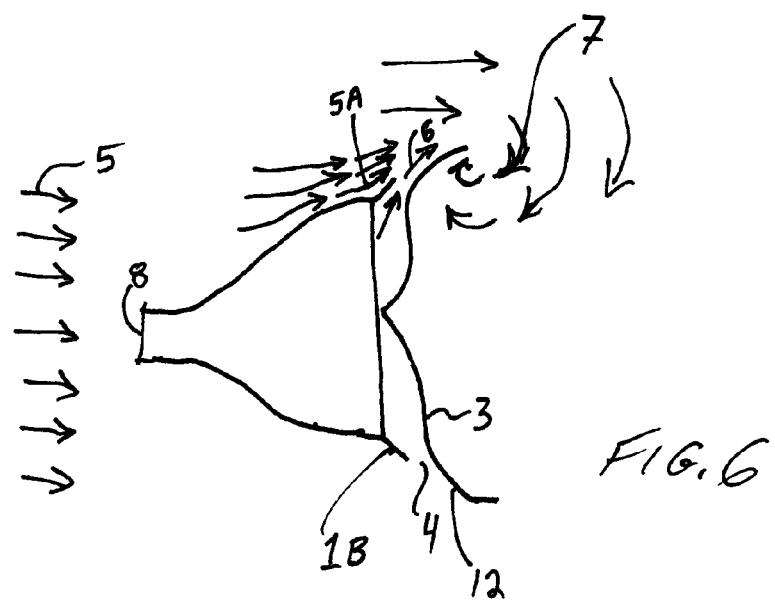
FIG. 6 is a schematic side view similar to FIG. 5, but showing a backflow preventer having a greater width than the turbine machine, and showing extended ambient flow deflector tabs or lips to deflect the accelerated ambient flow outwardly.

FIGS. 4, 5 and 6 schematically show three different arrangements regarding the backflow preventer 3. In FIG. 4, a machine with a discharge outlet 4 facing downstream in the ambient flow 5 has no backflow preventer 3, but instead the reduced-energy spent flow 6 is discharged directly axially rearwardly back into the surrounding fluid. However, a downstream wake 7 forms due to the reduced pressure and reduced energy of the discharged spent flow 6 and due to the structural obstruction presented by the machine, which causes surrounding fluid to form turbulent vortices and curl into the area behind or downstream from the discharge outlet 4. The resulting wake turbulence disturbs and hinders the discharge of the spent fluid 6.

In comparison, the machine schematically illustrated in FIG. 5 has a backflow preventer 3 and accordingly displaces the discharge outlet 4 to a lateral position near the rear end of the machine. The backflow preventer 3 helps to prevent an influence of the downstream wake 7 on the discharge of spent fluid 6. But in the embodiment of FIG. 5, the backflow preventer 3 is narrower, i.e. has a smaller width or beam, compared to the width or beam of the turbine machine itself. Therefore, some wake vortices of the wake 7 can curl back into the discharge outlet and hinder the discharge of spent fluid 6. This narrow backflow preventer also does not provide a mixing surface.

FIG. 6 shows a further varied embodiment in which a backflow preventer 3 has a greater width or beam compared to the turbine machine. Also, the rear or downstream outer edges of the turbine machine have been supplemented with an additional ambient flow deflector lip 1B that serves to further outwardly deflect a portion of the ambient flow. The effects of such an embodiment have been discussed above. The backflow preventer 3 of greater width than the turbine machine ensures that an effective mixing surface 12 is provided extending laterally outwardly and rearwardly from the discharge outlet 4, the ambient flow deflector lip 1B provides additional outward momentum and acceleration of the accelerated fluid crossing and curving back inwardly around the discharge outlet 4, and thereby the spent fluid 6 is effectively drawn outwardly and mixed into the accelerated fluid 5A, and then mixed along the mixing surface 12. Also, any arising downstream wake 7 is entirely blocked from the discharge outlet 4, and thereby cannot hinder the discharge of the spent fluid 6. Comparing the FIGS. 4, 5 and 6, therefore the arrangement of FIG. 5 is preferred over that of FIG. 4, and the arrangement of FIG. 6 is preferred over that of FIG. 5. Also, as can be seen in FIG. 6, the fluid flow channel is divided at a divergence location and from there diverges smoothly along curving channel portions out to the discharge outlets 4.

FIGS. 7 to 12 schematically illustrate six different embodiments of particular arrangements of the discharge outlet 4 formed between the outer edge 1A of the ambient flow deflector 1 and the forward portion of the downstream body 16. In FIG. 7, both the outer edge 1A of the ambient flow deflector 1 and the forward portion of the downstream body 16 have flanges 10 that form a discharge channel leading to the discharge outlet 4. In this configuration, the discharge channel extends substantially perpendicularly to the axial direction of the ambient flow, and the outer edge 1A of the ambient flow deflector 1 is essentially axially aligned with (i.e. has a similar radial or lateral position as) the adjacent edge of the downstream body 16. This configuration lacks a significant mixing surface and is thus not preferred in this regard. On the other hand, this configuration defines a discharge channel between two flanges, which allows the most control over the direction and speed of the discharge of the spent fluid.

In the configuration of FIG. 8, there are no flanges 10, but is rather simply a clean-edged opening that forms the discharge outlet 4. The downstream body 16 extends somewhat laterally or radially outwardly beyond the outer edge 1A of the ambient flow deflector 1 and thus provides a mixing surface 12, which is preferred.

In the configuration of FIG. 9, the two edges bounding the discharge outlet 4 are formed by flanges 10 which allow a nozzle configuration to be formed in the discharge channel. This configuration does not provide a significant mixing surface 12 because the downstream body 16 does not extend outwardly beyond the outer edge 1A of the ambient flow deflector 1.

FIG. 10 shows a configuration somewhat similar to FIG. 8, but there is a lateral or radial range of overlap between the forward portion of the downstream body 16 and the outer portion of the ambient flow deflector 1, which forms a discharge channel therebetween even without flanges 10.

The configuration of FIG. 11 includes a streamline-shaped flange 10 only on the forward end of the downstream body 16, and a clean terminal edge at the outer edge 1A of the ambient flow deflector 1. The streamline-shaped flange 10 also assists in smoothing the internal flow of the spent fluid 6 leading to the discharge outlet 4.

FIG. 12 shows a configuration in which two sets of discharge vanes 11 have been introduced within the discharge outlet 4. This divides the discharge outlet 4 into three outlet portions or outlet passages. The two discharge vanes 11 extend to different lengths laterally or radially outwardly beyond the outer edge 1A of the ambient flow deflector 1, thereby providing the effect of additional outward deflection surfaces and/or additional mixing surfaces. Instead of this illustrated embodiment, one set or three or more sets of vanes 11 may be provided, and vanes may be affixed directly at the outer edge 1A of the deflector 1, rather than being positioned between the outer edge 1A and the forward portion of the downstream body 16.

Figure 13:
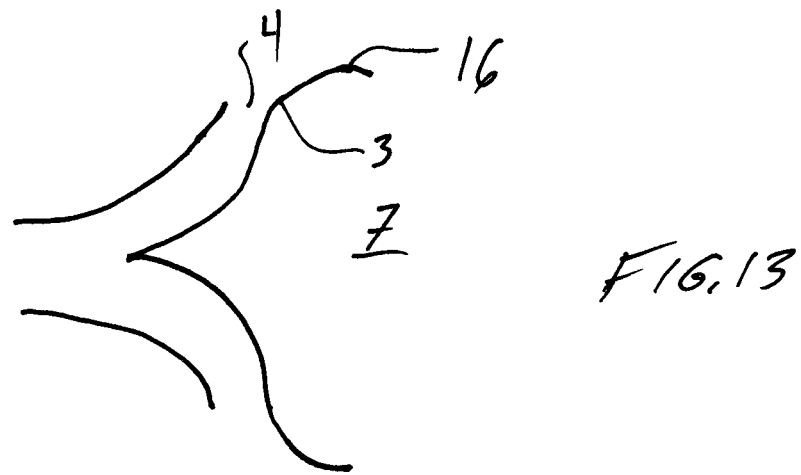
FIGS. 13 to 15 are schematic sectional diagrams of three different configurations of downstream bodies including a mixing surface and a backflow preventer.
Figure 14:
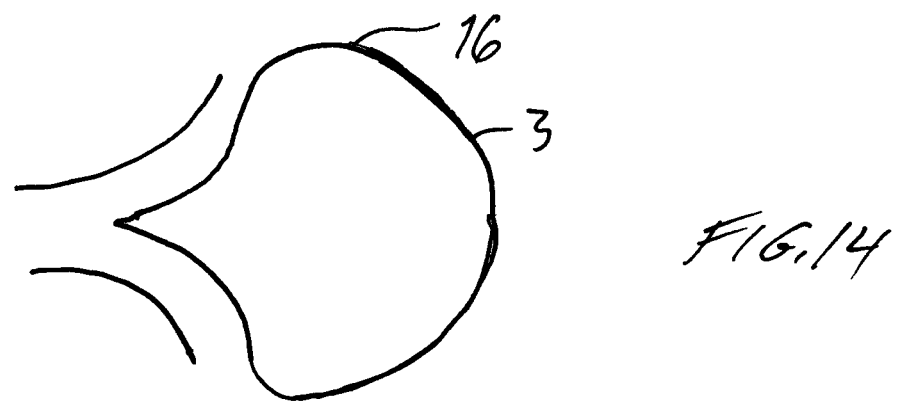
Figure 15:
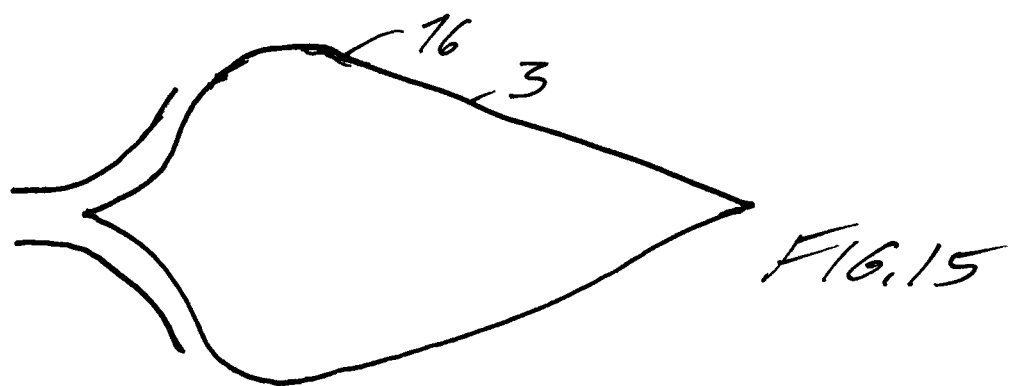

FIGS. 13, 14 and 15 schematically illustrate three different embodiments having different configurations of the downstream body 16, especially regarding the shape of the backflow preventer 3 of the downstream body 16. In FIG. 13, the backflow preventer 3 serves its purpose of preventing the downstream wake 7 from influencing the flow conditions at the discharge outlet 4. However, the backflow preventer 3 is not configured to minimize or reduce the generation of the downstream wake turbulence. In such an embodiment, the anchoring force required to stationarily anchor or mount the turbine apparatus will be increased, but the power-extraction operation thereof will not be affected negatively. In FIGS. 14 and 15, the closed impermeable surface of the backflow preventer 3 has been extended rearwardly and given a more streamlined shape in order to help reduce the formation of wake turbulence and a downstream wake 7 behind the machine. This helps to reduce the drag on the machine and thus reduce the anchoring force needed to stationarily anchor or mount the machine in a flowing fluid stream. Also, this helps to reduce the turbulent disturbance of the flow downstream from the machine, and thereby is believed to allow plural power-extraction machines to be arranged more closely to one another in an array, e.g. a "wind farm" or "tidal power farm". As can be seen in each of these FIGS. 13, 14 and 15, the fluid flow channel is divided at a divergence location and from there diverges smoothly along curving channel portions out to the discharge outlets 4.

Figure 16:
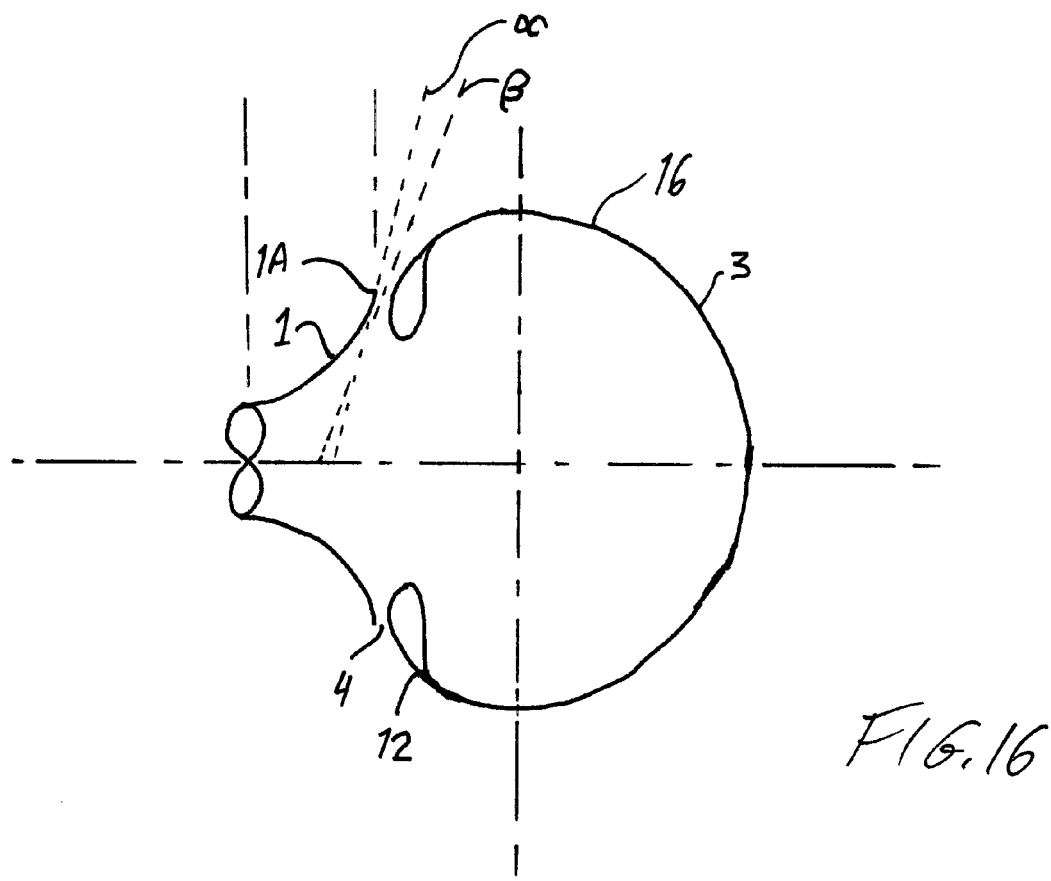
FIG. 16 is a schematic sectional illustration of a fluid turbine machine with a spent flow discharge apparatus according to an embodiment of the invention having preferred values of certain structural parameters and relationships thereof.

FIG. 16 is a schematic axial sectional view of an embodiment of a machine and apparatus according to the present invention in which certain parameters and ratios are optimized. The size of the machine according to the invention is scalable to any desired or required size. This is especially true because the discharge outlet(s) may be made as large as necessary, and/or distributed over many outlets over a large area, in order to appropriately handle the fluid throughflow provided by the intake inlet. Regardless of the actual size of the machine, there are certain parameters and certain relationships for which general ranges, preferred ranges, and presently most-preferred values can be specified.

These parameters and relationships are as follows.

α) angle of the outer edge portion of the ambient flow deflector relative to the axial direction (ambient flow direction) as measured from the downstream side;

β) angle of discharge passage centerline at the discharge outlet relative to the axial direction as measured from the downstream side;

C) maximum width or diameter of the widest part of the backflow preventer or the mixing surface relative to the maximum width or diameter of the outer edge of the ambient flow deflector;

D) total flow cross-sectional area of the discharge outlet(s) relative to the total flow cross-sectional area of the fluid intake inlet(s);

E) axial distance from the plane of the outer edge of the ambient flow deflector to the widest part of the downstream body (including the backflow preventer and the mixing surface), relative to the width of the downstream body at the widest part;

F) axial distance from the plane of the outer edge of the ambient flow deflector to the widest part of the downstream body (including the backflow preventer and the mixing surface), relative to the total axial length of the downstream body from the plane of the outer edge of the ambient flow deflector to the aft tail end of the downstream body (e.g. of the backflow preventer);

G) axial length of the mixing surface from the plane of the outer edge of the ambient flow deflector to the downstream end relative to the width of the widest part of the downstream body;

H) axial length of the ambient flow deflector relative to its width;

I) maximum width or diameter of the radially outer edge of the ambient flow deflector relative to the width or diameter of the intake inlet.

For each one of the above identified parameters or relationships, the values that are presently considered as the generally preferred range, the especially preferred range, and the most preferred value (in that order for each parameter) are as follows. While a presently most preferred embodiment of a machine according to the invention has these values or falls within these ranges, they are optional, i.e. not mandatory for all embodiments according to the invention.

α. 3-90, 25-85, 75 (degrees)
β. 30-110, 50-90, 70 (degrees)
C. 1.1-5.0, 1.2-2.0, 1.5 (ratio)
D. 0.5-5.0, 1.2-2.5, 1.4 (ratio)
E. 0.1-2.0, 0.2-0.8, 0.3 (ratio)
F. 0.1-1.0, 0.2-0.5, 0.4 (ratio)
G. 0.1-5.0, 0.5-2.0, 0.75 (ratio)
H. 0.0-3.0, 0.2-0.6, 0.4 (ratio)
I. 1.1-10, 2.0-5.0, 2.8 (ratio)

Figure 17:
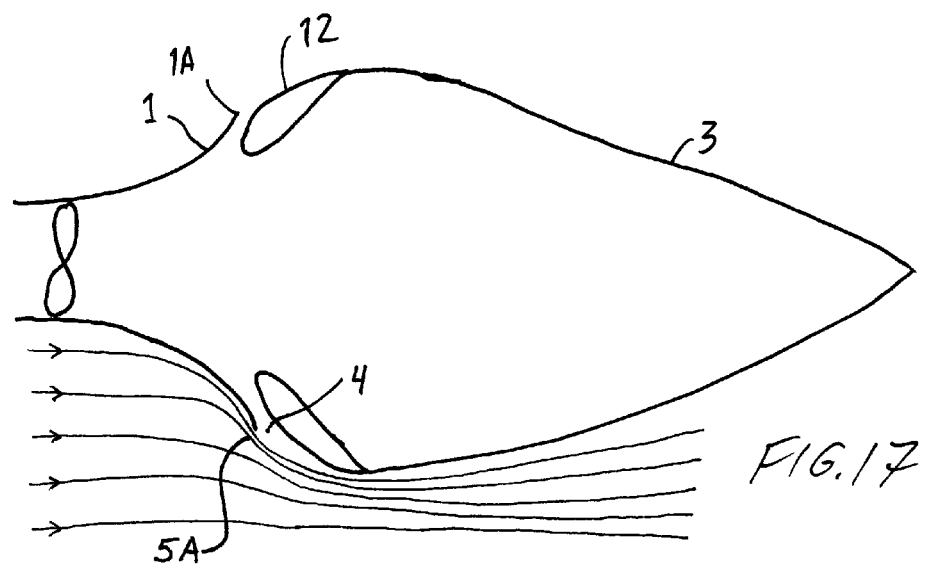
FIG. 17 is a sectional side view of another configuration of a backflow preventer.

FIG. 17 presents a schematic axial sectional view somewhat similar to FIGS. 15 and 16, but the closed imperforate surface of the backflow preventer 3 has been extended farther rearwardly to help reduce the generation of wake turbulence on the downstream side of the machine. This configuration begins to resemble that of an axial section through a fish's body, whereby the discharge outlets 4 are similar to the gill openings of the fish, and the ambient flow deflector 1 with the outer edge 1A thereof has some similarity to the gill flaps and gill edges of the fish, while the backflow preventer 3 is similar to the long tapering body of the tail end of the fish. It is believed that an inventive embodiment according to FIG. 17 achieves efficient low-loss and low-turbulence flow conditions similar to the naturally-tuned streamlined shape of a fish's body.

Figure 18:
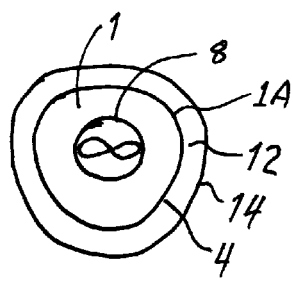
FIG. 18 is a schematic front view of a machine and apparatus according to an embodiment of the invention having a generally circular transverse sectional configuration.

FIG. 18 schematically shows a front view of a machine according to an embodiment of the invention having a generally circular transverse sectional shape of the fluid intake inlet 8, the outer edge 1A of the ambient flow deflector 1, the discharge outlet 4, the mixing surface 12 and the widest part 14 of the downstream body.

Figure 19:
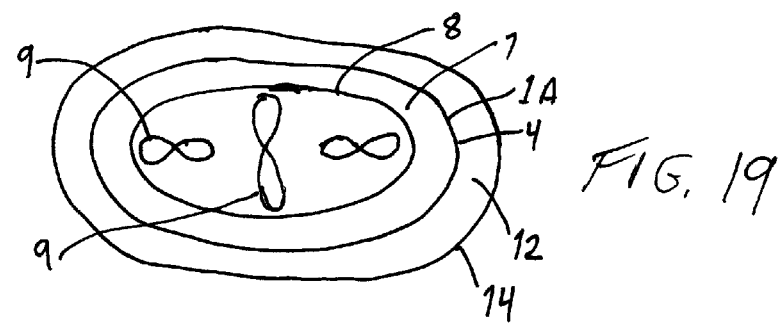
FIG. 19 is a schematic front view of a machine and apparatus according to an embodiment of the invention having a substantially oval transverse sectional configuration.

FIG. 19 is a view similar to that of FIG. 18, but showing an embodiment with a generally oval transverse sectional shape, for example with three axial flow rotors 9 arranged within the fluid intake inlet 8. Another alternative has a generally rectangular front view configuration in which a transverse axis rotor is installed.

Figure 20:
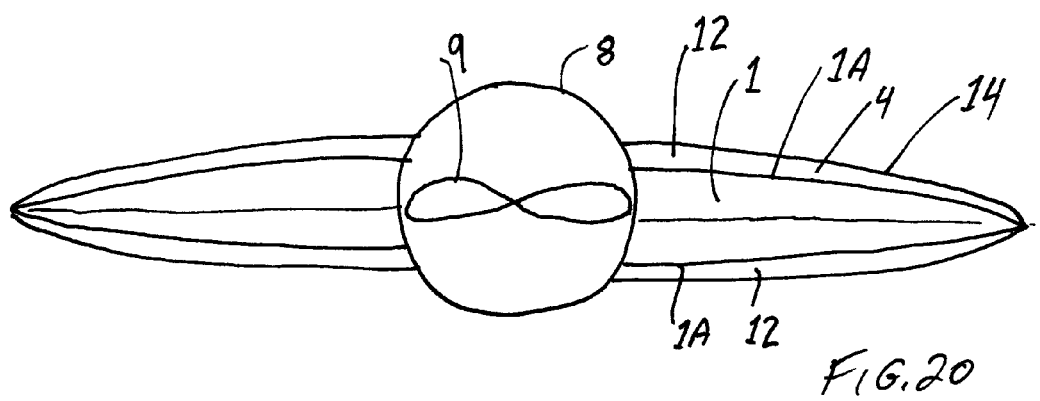
FIG. 20 is a schematic front view of a machine and apparatus according to an embodiment of the invention having a transverse sectional configuration including a circular intake inlet and laterally protruding wings or arms providing the spent flow discharge apparatus.

FIG. 20 is a schematic front view of another configuration of a machine according to an embodiment of the invention, having a circular transverse section of the fluid intake inlet 8 and an elongated elliptical or lenticular transverse section of the ambient flow deflector 1 in the manner of laterally extending wings or arms. The discharge outlet 4 is provided predominantly along upper and lower surfaces of these laterally projecting wings or arms. This demonstrates that the dimensions and configuration of the flow deflector 1 and the discharge outlet(s) 4 can be adjusted as desired or as necessary in order to achieve the required flow conditions.

Figure 21:
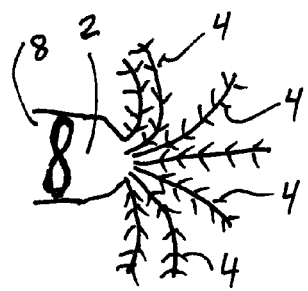
FIG. 21 is a schematic axial sectional view of an embodiment of the machine and apparatus according to the invention having a single intake inlet and fluid flow channel feeding in a distributed manner into plural discharge conduits that each have plural discharge outlets distributed therealong.
Figure 22:
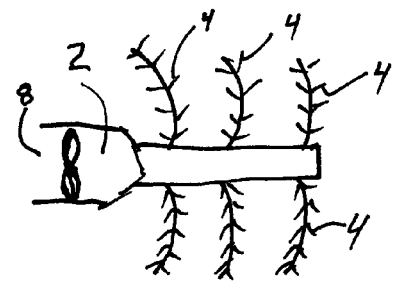
FIG. 22 is a schematic axial sectional view of another embodiment of the machine and apparatus according to the invention having a single intake inlet and fluid flow channel feeding in a distributed manner into plural discharge conduits that each have plural discharge outlets distributed therealong.

FIGS. 21 and 22 are schematic axial sectional views diagrammatically representing embodiments in which a single fluid intake inlet 8 and a single fluid flow channel 2 branches into plural discharge outlet channels with discharge outlets 4 distributed therealong. This could involve a branching network of ever-smaller tubes, whereby the discharge outlets are slots in the smallest tubes at the periphery of the network. As a further alternative, the discharge outlet can be configured like one big peacock's tail fanned out on display, or the apparatus can include many small fan-shaped discharge outlets. These are further representations of how the discharged fluid can be distributed in various different ways to eject it back into the ambient flow with maximum efficiency and minimum disturbance of the downstream flow field.

Figure 23:
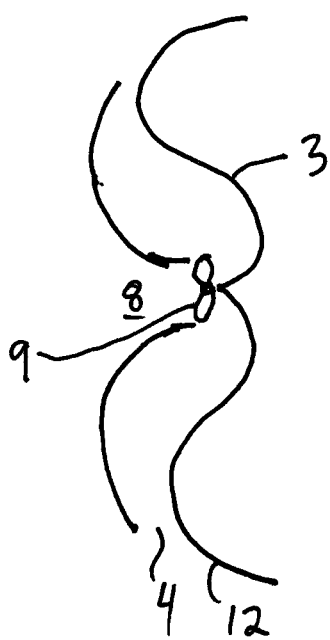
FIGS. 23 and 24 are schematic axial sectional views of further embodiments of a machine and apparatus according to the invention in which a power-extracting rotor expels spent flow radially outwardly rather than axially rearwardly.
Figure 24:
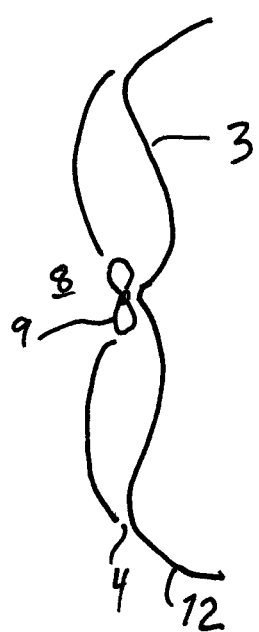

FIGS. 23 and 24 are schematic axial sectional views of two further embodiments in which a rotor 9 expels the spent flow 6 centrifugally in a radially outward direction toward the discharge outlet 4.

The terms "upstream", "downstream", "forward", "rearward", and the like in this application refer to the parts, components and orientation of the machine with reference to the "axial" flow direction of the ambient flow of fluid in which the machine is immersed, whereby it is assumed that the fluid intake inlet of the machine will be oriented to face generally "upstream" (e.g. within +/−20°) into the oncoming flow of ambient fluid. These directional references are used to describe relative orientations and positions of components of the machine even when the machine is not immersed in the fluid.

The machine may be bilaterally mirror-symmetrical, or fully rotationally cylindrically symmetrical, or step-wise rotationally symmetrical (e.g. in 3, 4, 5, 6 or more cylindrical segments), or even non-symmetrical about the axis of the machine that is to be generally aligned with the ambient flow direction. Therefore, the terms "radially" and "laterally" herein are referenced relative to the axial direction of the axis of the machine, and should be understood as being substantially interchangeable with respect to different embodiments of the invention having the different types of symmetry mentioned above. Also the terms "radially" and "laterally" do not necessarily mean a direction or contour that extends exactly and purely perpendicularly to a central axis, but rather mean generally a direction or contour that includes at least a component in a true radial or lateral direction (and possibly also includes a component in an axial direction parallel to a central axis). Also, the drawings and descriptions of different embodiments should be understood as applying equally to other embodiments having a different type of symmetry, whether or not such other embodiments are expressly described and illustrated.

While the illustrated embodiments show a power-extraction device such as a turbine rotor arranged in a duct or channel within a housing, it is not mandatory to provide such a housing and duct. In other words, in other embodiments of the invention, a turbine rotor can be arranged freely exposed to the ambient stream (instead of in a duct), and the spent flow discharge apparatus comprises a downstream body including a backflow preventer and a mixing surface along which flows the fluid discharged from the rotor. For example, such an embodiment can be represented by omitting the forward housing (including the inlet 8, the ambient flow deflector 1 and the fluid flow channel 2) from the machines shown in FIG. 2, 5, 6, 13, 14, 15, 16, 17, 23 or 24. Also, in further alternative embodiments, the rotor may be a transverse axis rotor rather than a rotor having its axis aligned with the ambient flow. Some rotor configurations have an effect of radially outwardly or centrifugally expelling the spent fluid, which can obviate the provision of an ambient fluid deflector.

Any one of the components described and illustrated herein may be a single, unitary, one-piece integral part, or may be made up of several individual parts joined together to achieve the stated purposes. The structure of the machine and of any one or more components thereof may be an article of manufacture that can be built of fiberglass, other fiber reinforced composite materials, plastic, wood strips, sheet metal, and/or other standard materials of construction suitable for marine or weather-exposed applications. Techniques for shaping and joining such materials are well understood by persons skilled in the art.

A particular embodiment of a machine according to the present application is represented by a combination of any selected plurality or all of the features of a spent flow discharge structure comprising several flow control components and means of affixing said components together and immersing them in a stream for promoting effective operation of an instream hydropower generator; wherein:
  said spent flow discharge structure has a longitudinal axis of configuration with forward and aft coordinates of relative positioning, a radial axis of configuration with inward and outward coordinates of relative positioning, and a rotational axis of configuration with rotational coordinates of relative positioning determined as a degree of rotation from a reference plane that is defined in the other two axes,
  said flow control components include an ambient flow barrier, a backflow preventer, and a mixing plate,
  said ambient flow barrier, said backflow preventer, and said mixing plate contain flow impact surfaces whose respective shapes in combination together induce the functionality of said spent flow discharge structure, and whose respective extents define and bound the functional coordinates of said surfaces, said components, and said structure, respectively, said ambient flow barrier has a forward and exterior flow impact surface extending from a longitudinal and radial position aft and outward at all functional rotational coordinates, said backflow preventer has an aft and exterior flow impact surface extending from a longitudinal and radial position forward and outward at all functional rotational coordinates, said ambient flow barrier and said backflow preventer are affixed and configured together such that backflow preventer's aft and exterior flow impact surface is located aft of ambient flow barrier's forward and exterior flow impact surface, in the entireties of said surfaces, respectively, at all functional rotational coordinates, said backflow preventer's aft and exterior flow impact surface extends outward to a greater degree than does ambient flow barrier's forward and exterior flow impact surface, at the fullest extents of radial positioning of both said surfaces, respectively, at all functional rotational coordinates, said mixing plate has a forward and exterior flow impact surface that extends from a longitudinal and radial position forward and inward at all functional rotational coordinates, wherein aft-most extent of said mixing plate's forward and exterior flow impact surface is contiguous with the forward-most extent of backflow preventer's aft and exterior flow impact surface, and forward-most extent of said mixing plate's forward and exterior flow impact surface is aft of, and not exterior to, aft-most extent of said ambient flow barrier's forward and exterior flow impact surface;

said ambient flow barrier has an aft and interior flow impact surface extending from a given longitudinal and radial position aft and outward at all functional rotational coordinates, said backflow preventer has a forward and interior flow impact surface extending from a given longitudinal position and radial origin forward and, ultimately, outward at all functional rotational coordinates, said forward and interior flow impact surface of said backflow preventer is aft of said aft and interior flow impact surface of said ambient flow barrier at all radial coordinates, the forward-most portion of said backflow preventer and the aft-most portion of said ambient flow barrier in combination bound a longitudinal gap at all functional rotational coordinates, said spent flow discharge structure is attached and deployed in combination with an instream hydropower generator, in a stream which has an external component of flow that passes outside of and around said combination in a generally longitudinal direction and an internal component of flow that passes inside of and through said combination, said generator has spent flow to be discharged, said forward and exterior flow impact surface of said ambient flow barrier deflects a portion of said external component of flow upon impact thereof, said aft and interior flow impact surface of said ambient flow barrier and said forward and interior flow impact surface of said backflow preventer in combination bound a passageway for drawing and conveying said internal component of flow into said external component of flow through said longitudinal gap, said deflection of said portion of said external flow is terminated at said aft-most portion of said ambient flow barrier, said termination of said deflection allows said external flow to resume its longitudinal direction, providing draw at the inside of its curved turning, the mixing plate provides a surface for mixing internal flow with external flow upon discharge, the backflow preventer allows mixed components of flow to come back together down the stream, the stream has an upstream and a downstream direction of ambient flow, the generator is deployed with forward end upstream, longitudinal axis parallel to ambient flow.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims or in any of the embodiments disclosed herein. The abstract of the disclosure does not define or limit the claimed invention, but rather merely abstracts certain features disclosed in the application.

What is claimed is:

1. An instream fluid power-extraction machine to be immersed in an ambient flow of a surrounding fluid so as to capture a portion of the fluid, extract energy from the captured fluid thereby producing spent fluid, and then discharge the spent fluid as discharged fluid back into the ambient flow, wherein said machine comprises:

a housing that bounds a fluid intake inlet and that includes an ambient flow deflector, wherein said fluid intake inlet is oriented with a central axis thereof extending in an axial direction to be arranged facing axially forwardly upstream in the ambient flow, said ambient flow deflector extends laterally or radially outwardly, relative to said central axis, to an outer edge of said ambient flow deflector located laterally or radially outwardly from said fluid intake inlet, and said ambient flow deflector is configured and arranged to intercept and deflect laterally or radially outwardly a portion of the ambient flow to form thereof an accelerated flow of the surrounding fluid at said outer edge of said ambient flow deflector;

a downstream body arranged axially rearwardly from said ambient flow deflector, with a discharge outlet formed between said outer edge of said ambient flow deflector and a forward portion of said downstream body, wherein said downstream body comprises a mixing surface that extends laterally or radially outwardly from said forward portion to a widest part of said downstream body located axially rearwardly from said discharge outlet, said widest part of said downstream body is located laterally or radially outwardly, relative to said central axis, farther than said outer edge of said ambient flow deflector and farther than said discharge outlet, and said downstream body further comprises a backflow preventer having a continuous closed imperforate backflow prevention surface that extends from said widest part of said downstream body laterally or radially inwardly to a closed center;

a fluid flow channel within said machine communicating from said fluid intake inlet to said discharge outlet, wherein said fluid intake inlet is configured and adapted to capture the captured fluid, and said discharge outlet is configured and adapted to discharge the spent fluid as the discharged fluid back into the surrounding fluid; and a power extraction device arranged in said fluid flow channel, and configured to extract power from the captured fluid flowing in said fluid flow channel thereby producing the spent fluid.

2. The machine according to claim 1, wherein said discharge outlet is located and configured to discharge the discharged fluid into the accelerated flow of the surrounding fluid, and wherein said mixing surface is located and configured to mix the discharged fluid into the accelerated flow of the surrounding fluid by a boundary layer shearing effect along said mixing surface and/or a laminar flow shearing effect of the ambient flow meeting the discharged fluid and the accelerated flow of the surrounding fluid.

3. The machine according to claim 1, wherein said discharge outlet is located and configured to discharge the discharged fluid into the accelerated flow of the surrounding fluid, and wherein said outer edge of said ambient flow deflector, said discharge outlet, said mixing surface and said widest part of said downstream body are located and configured to cause turbulent mixing of the discharged fluid, the accelerated flow and the ambient flow of the surrounding fluid along said mixing surface, without any wake vortices flowing back into said discharge outlet.

4. The machine according to claim 1, wherein said forward portion of said downstream body comprises a flange that bounds one side of a discharge channel portion of said fluid flow channel, said discharge outlet is bounded between said flange and said outer edge of said ambient flow deflector, and said flange transitions fairly and smoothly into said mixing surface.

5. The machine according to claim 1, wherein said ambient flow deflector has a surface contour with an outwardly concavely curved cross-sectional shape.

6. The machine according to claim 1, wherein an outer cross-sectional contour of a portion of said machine extending from said outer edge of said ambient flow deflector across said discharge outlet to and along said mixing surface is outwardly convexly curved.

7. The machine according to claim 1, wherein said outer edge of said ambient flow deflector, said discharge outlet and said mixing surface are located and configured so that the accelerated flow of the surrounding fluid transitions through a convex curve from an outwardly deflected direction toward a downstream axial direction at a location adjacent to said discharge outlet, with a concave inner side of the convex curve facing inwardly toward said discharge outlet.

8. The machine according to claim 1, wherein said downstream body from said forward portion thereof to said closed center thereof has a continuous closed imperforate outer surface that does not allow the fluid to flow therethrough, and said closed center forms a rear end of said downstream body that is located axially rearwardly from said widest part along said central axis of said fluid intake inlet extending in said axial direction.

9. The machine according to claim 1, wherein said fluid flow channel includes a fluid plenum space within said backflow preventer.

10. The machine according to claim 1, wherein said fluid flow channel extends axially rearwardly from said fluid intake inlet to a divergence location rearward from said power extraction device, from said divergence location said fluid flow channel is divided and diverges smoothly along a curving channel portion extending laterally or radially outwardly and rearwardly to said discharge outlet, and said fluid flow channel does not extend rearwardly beyond said discharge outlet into said downstream body.

11. The machine according to claim 1, wherein said discharge outlet comprises a single elongated slot between said outer edge of said ambient flow deflector and said forward portion of said downstream body.

12. The machine according to claim 1, wherein said discharge outlet comprises plural individual openings between said outer edge of said ambient flow deflector and said forward portion of said downstream body.

13. The machine according to claim 1, further comprising plural discharge mixing vanes arranged in or along said discharge outlet between, and extending laterally or radially outwardly beyond, said outer edge of said ambient flow deflector and said forward portion of said downstream body.

14. The machine according to claim 1, wherein said power extraction device comprises an axial flow rotor having a rotor axis aligned with said axial direction, and said fluid flow channel extends axially rearwardly along said axial flow rotor and thence diverges laterally or radially outwardly to said discharge outlet.

15. The machine according to claim 1, wherein said power extraction device comprises a rotor having a rotor axis oriented transversely to said axial direction, and said fluid flow channel extends transversely to said axial direction along said rotor.

16. The machine according to claim 1, excluding any structure that is configured and arranged to deflect or draw the surrounding fluid laterally or radially inwardly into the spent fluid or the discharged fluid.

17. The machine according to claim 1, excluding any structure that is configured and arranged to intermix the spent fluid or the discharged fluid with the surrounding fluid internally radially or laterally within said machine.

18. An instream fluid power-extraction machine adapted to be immersed in an ambient flow of a surrounding fluid and to extract energy from a captured portion of the fluid, comprising:
- a front end featuring a fluid intake inlet with a central axis thereof extending in an axial direction, and featuring an ambient flow deflector that extends laterally or radially outwardly, relative to said central axis, from said fluid intake inlet to an outer edge of said ambient flow deflector;
- a rear end featuring a closed fluid-impervious surface extending continuously across a widest part of said rear end;
- a radially or laterally outer side featuring a discharge outlet located forwardly from said widest part, and a mixing surface extending rearwardly as well as radially or laterally outwardly from said discharge outlet to said widest part;
- an internal fluid flow channel communicating from said fluid intake inlet to said discharge outlet; and
- a power-extraction device arranged in said fluid flow channel;
- wherein said widest part is located laterally or radially outwardly, relative to said central axis, farther than said outer edge of said ambient flow deflector and farther than said discharge outlet.

19. An instream fluid power-extraction machine to be immersed in an ambient flow of a surrounding fluid so as to capture a portion of the fluid, extract energy from the captured fluid thereby producing spent fluid, and then discharge the spent fluid as discharged fluid back into the ambient flow, wherein said machine comprises:
- a housing that bounds a fluid intake inlet and that includes an ambient flow deflector, wherein said fluid intake inlet is oriented facing in an axial direction to be arranged facing axially forwardly upstream in the ambient flow, said ambient flow deflector extends laterally or radially outwardly to an outer edge of said ambient flow deflector located laterally or radially outwardly from said fluid intake inlet, and said ambient flow deflector is configured and arranged to intercept and deflect laterally or radially outwardly a portion of the ambient flow to form thereof an accelerated flow of the surrounding fluid at said outer edge of said ambient flow deflector;

a downstream body arranged axially rearwardly from said ambient flow deflector, with a discharge outlet formed between said outer edge of said ambient flow deflector and a forward portion of said downstream body, wherein said downstream body comprises a mixing surface that extends laterally or radially outwardly from said forward portion to a widest part of said downstream body located axially rearwardly from said discharge outlet, and said downstream body further comprises a backflow preventer having a continuous closed imperforate backflow prevention surface that extends from said widest part of said downstream body laterally or radially inwardly to a closed center;

a fluid flow channel within said machine communicating from said fluid intake inlet to said discharge outlet, wherein said fluid intake inlet is configured and adapted to capture the captured fluid, and said discharge outlet is configured and adapted to discharge the spent fluid as the discharged fluid back into the surrounding fluid; and a power extraction device arranged in said fluid flow channel, and configured to extract power from the captured fluid flowing in said fluid flow channel thereby producing the spent fluid;

wherein said discharge outlet is located and configured to discharge the discharged fluid into the accelerated flow of the surrounding fluid, and wherein said outer edge of said ambient flow deflector, said discharge outlet, said mixing surface and said widest part of said downstream body are located and configured to cause turbulent mixing of the discharged fluid, the accelerated flow and the ambient flow of the surrounding fluid along said mixing surface, without any wake vortices flowing back into said discharge outlet.

20. An instream fluid power-extraction machine adapted to be immersed in an ambient flow of a surrounding fluid so as to capture a portion of the fluid, and to extract energy from and then discharge the captured fluid as discharged fluid, comprising:

a front end featuring a fluid intake inlet and an ambient flow deflector that extends outwardly from said fluid intake inlet to an outer edge of said ambient flow deflector, wherein the ambient flow deflector is configured to intercept and deflect a portion of the surrounding fluid to form thereof an accelerated flow of fluid at said outer edge of said ambient flow deflector;

a rear end featuring a closed fluid-impervious surface extending continuously across a widest part of said rear end;

a radially or laterally outer side featuring a discharge outlet located forwardly from said widest part, and a mixing surface extending rearwardly as well as radially or laterally outwardly from said discharge outlet to said widest part;

an internal fluid flow channel communicating from said fluid intake inlet to said discharge outlet; and a power-extraction device arranged in said fluid flow channel;

wherein said discharge outlet is located and configured to discharge the discharged fluid into the accelerated flow of fluid; and wherein said outer edge of said ambient flow deflector, said discharge outlet, said mixing surface and said widest part are located and configured to cause turbulent mixing of the discharged fluid, the accelerated flow and the ambient flow of the surrounding fluid along said mixing surface, without any wake vortices flowing back into said discharge outlet.

21. A fluid discharge apparatus adapted to be immersed in an ambient flow of a surrounding fluid to discharge an effluent fluid into the surrounding fluid, wherein said apparatus is configured relative to a reference axis of the apparatus that is to be arranged extending axially forwardly upstream into the ambient flow of the surrounding fluid, and wherein said apparatus comprises:

an ambient flow deflector that extends rearwardly as well as laterally or radially outwardly, relative to said reference axis, to an outer edge of said ambient flow deflector;

a discharge outlet that is adapted to discharge the effluent fluid and that is bounded by and extends rearwardly from said outer edge of said ambient flow deflector;

a mixing surface that extends rearwardly as well as laterally or radially outwardly, relative to said reference axis, from said discharge outlet to a widest part of said mixing surface; and a closed fluid-impervious surface that extends continuously laterally or radially inwardly, relative to said reference axis, from said widest part to said reference axis, and thereby forms a closed rear end of said apparatus;

wherein said widest part is located laterally or radially outwardly, relative to said reference axis, farther than said outer edge of said ambient flow deflector and farther than said discharge outlet.

* * * * *